United States Patent [19]

Kobayakawa et al.

[11] Patent Number: 5,621,017
[45] Date of Patent: *Apr. 15, 1997

[54] PHOTOCHROMIC COMPOSITION AND METHOD PRODUCING PHOTOCHROMIC CURED PRODUCT

[75] Inventors: Takashi Kobayakawa; Junji Momoda, both of Tokuyama, Japan

[73] Assignee: Tokuyama Corporation, Tokuyama, Japan

[*] Notice: The term of this patent shall not extend beyond the expiration date of Pat. No. 5,395,566.

[21] Appl. No.: 428,641

[22] Filed: Apr. 25, 1995

[30] Foreign Application Priority Data

Apr. 27, 1994 [JP] Japan .................................. 6-089418

[51] Int. Cl.⁶ ............................... C08F 2/46; G02B 5/23
[52] U.S. Cl. .............................. 522/16; 522/26; 252/586
[58] Field of Search ..................... 522/16, 26; 252/586

[56] References Cited

U.S. PATENT DOCUMENTS 5,230,986  7/1993  Neckers ................................. 522/16
5,395,566  3/1995  Kobayakawa et al. ................ 252/586

FOREIGN PATENT DOCUMENTS 0559439   9/1993   European Pat. Off. .
0619358  10/1994   European Pat. Off. .
4325154   9/1994   Germany .

OTHER PUBLICATIONS

Patent Abstracts of Japan, vol. 13, No. 510 (C–654) Nov. 15, 1989, Abstract of Jap. Laid–Open Pat. Publ. No. 1–204902 (Aug. 17, 1989).

Patent Abstracts of Japan, vol. 16, No. 551 (P–1453) Nov. 20, 1992, Abstract of Jap. Laid–Open Pat. Publ. No. 4–208919 (Jul. 30, 1992).

*Primary Examiner*—Mark Chapman
*Attorney, Agent, or Firm*—Sherman And Shalloway

[57] ABSTRACT

A photochromic composition which can be polymerized and cured upon irradiation with active energy rays such as ultraviolet rays to exhibit favorable photochromic property. The photochromic composition comprises 100 parts by weight of a radical polymerizable monomer, 0.001 to 0.2 parts by weight of a photochromic compound, and 0.01 to 1 part by weight of a photo polymerization 1.0 initiator. A photochromic cured product is obtained by irradiating the photochromic composition with the light which contains ultraviolet rays.

14 Claims, No Drawings

PHOTOCHROMIC COMPOSITION AND METHOD PRODUCING PHOTOCHROMIC CURED PRODUCT

BACKGROUND OF THE INVENTION

1. Field of the Invention

The present invention relates to a photochromic composition which can be polymerized and cured upon irradiation with active energy rays such as ultraviolet rays to exhibit favorable photochromic property.

2. Description of the Prior Art

Photochromism is a phenomenon which has drawn considerable attention in the past several years and is a reversible action exhibited by certain compounds. That is, a compound quickly changes its color when it is irradiated with sun light or light containing ultraviolet rays such as of a mercury lamp and returns to its original color when it is no longer irradiated with the light and is placed in a dark place. A compound having this property is called a photochromic compound, and compounds having various structures have heretofore been known without, however, any common skeleton among their structures.

A polymer that exhibits photochromic property is obtained by a method of applying a photochromic compound onto the surfaces of a polymer that has been formed in advance and by a method in which the photochromic compound is dissolved in a radical polymerizable monomer which is then polymerized.

The radical polymerizable monomer can be generally polymerized by either a method in which the polymerization is accomplished with heat or a method in which the polymerization is accomplished with light. When the radical polymerizable monomer dissolving the photochromic compound is polymerized with light to obtain a polymer having photochromic property, however, the photochromic compound contained therein absorbs ultraviolet rays which are necessary for polymerizing the radical polymerizable monomer, and the transmission of light is hindered by color developed by the photochromic compound itself upon irradiation with the light, making it difficult to favorably polymerize the radical polymerizable monomer. According to the present inventors, furthermore, it has been known that when the photochromic compound is dispersed in the insufficiently polymerized matrix polymer as a result of employing the photo polymerization, the obtained photochromic property lasts for only very decreased periods of time (life is shortened).

Because of these reasons, therefore, the photochromic polymer is obtained, usually, by polymerizing the radical polymerizable monomer in which the photochromic compound is contained (dissolved) with heat. According to this polymerization method with heat, however, the polymerization time usually lasts for several hours, which is not satisfactory from the standpoint of productivity.

SUMMARY OF THE INVENTION

In view of the above-mentioned circumstances, the object of the present invention is to obtain a polymer which can be easily polymerized within short periods of time and still exhibit an excellent photochromic property.

In order to solve the above-mentioned problems, the present inventors have studies the same intensively and, have discovered the fact that the above-mentioned object can be accomplished if a photochromic compound of a particular low concentration is combined with a radical polymerizable monomer and a photo polymerization initiator, and have thus completed the present invention.

That is, the present invention is concerned with a photochromic composition comprising:

| | |
|---|---|
| (A) a radical polymerizable monomer | 100 parts by weight, |
| (B) a photochromic compound | 0.001 to 0.2 parts by weight, |
| and | |
| (C) a photo polymerization initiator | 0.01 to 1 part by weight. |

DETAILED DESCRIPTION OF PREFERRED EMBODIMENTS

A first component in the photochromic composition of the present invention is a radical polymerizable monomer. As such a radical polymerizable monomer, there can be used any widely known monomer having a radical polymerizing group without any limitation. Examples of the radical polymerizing group include acrylate group, methacrylate group, vinyl group, and the like.

Radical polymerizable monomers that can be suitably used in the present invention include monomers of the following formulas, which can be used being mixed together in two or more kinds.

That is, a diacrylate compound or a dimethacrylate compound represented by the general formula (I)

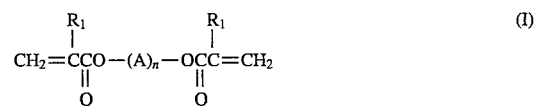

wherein $R_1$ and $R_2$ may be the same or different and are hydrogen atoms or methyl groups, and A is the same or different alkylene group, oxyalkylene group, or a group of the following formula which may be substituted,

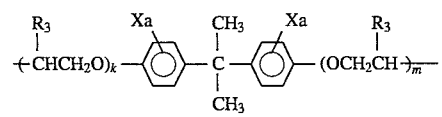

wherein $R_3$ is a hydrogen atom or a methyl group, X is a halogen atom, k and m are integers of from 0 to 1, a is an integer of from 0 to 4 representing the substitution number of halogen atoms, and n is an integer of from 1 to 20, an acrylate compound or a methacrylate compound having an epoxy group represented by the general formula (II)

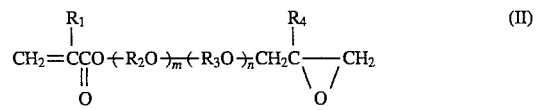

wherein $R_1$ and $R_4$ are hydrogen atoms or methyl groups, and $R_2$ and $R_3$ may be the same or different and are alkylene groups or groups of the following formula which may be substituted,

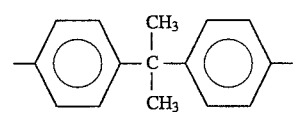

wherein m and n are 0 or 1,
and a vinylbenzyl compound represented by the general formula (III)

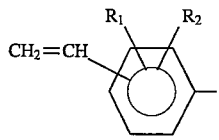 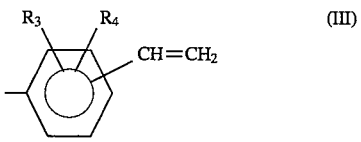

wherein $R_1$, $R_2$, $R_3$ and $R_4$ may be the same or different and are halogen atoms, $X_1$, $X_2$ and $X_3$ are oxygen atoms or sulfur atoms, j, k and m are 0 or 1, respectively, and j=0 when k=0 or k=j=0 when m=0, but $X_1$, $X_2$ and $X_3$ are not simultaneously sulfur atoms when m=k=1 and j=0.

Concrete examples of the radical polymerizable monomer that can be favorably used in the present invention include the following compounds. That is, a diacrylate compound or a dimethacrylate compound represented by the formula (I), such as diethylene glycol dimethacrylate, triethylene glycol dimethacrylate, tetraethylene glycol dimethacrylate, butanediol dimethacrylate, hexamethylene dimethacrylate, 2,2-bis(4-methacryloyloxyethoxy-3,5-dibromophenyl) propane, and 2,2-bis(4-methacryloyloxyethoxyphenyl) propane; an acrylate compound or a methacrylate compound having an epoxy group represented by the general formula (II), such as glycidyl acrylate, glycidyl methacrylate, β-methylglycidyl acrylate, β-methylglycidyl methacrylate and bisphenol A-monoglycidyl ether methacrylate; and a vinylbenzyl compound represented by the general formula (III), such as bis-4-vinylbenzyl ether, bis-4-vinylbenzyl sulfide, 1,2-(p-vinylbenzyloxy) ethane, 1,2-(p-vinylbenzylthio) ethane, bis-(p-vinylbenzyloxyethyl) sulfide, etc.

Here, these radical polymerizable monomers may be used together with other radical polymerizable monomers that are copolymerizable therewith. Examples of those other radical polymerizable monomer include unsaturated carboxylic acids such as acrylic acid, methacrylic acid, maleic arthydride, and fumaric acid; acrylic and methacrylic ester compounds such as methyl acrylate, methyl methacrylate, benzyl methacrylate, phenyl methacrylate, tribromophenyl methacrylate, 2-hydroxyethyl methacrylate, bisphenol-A dimethacrylate, trifluoromethyl methacrylate, urethane acrylate and epoxy acrylate; fumaric ester compounds such as monomethyl fumarate, diethyl fumarate and diphenyl fumarate; allyl compounds such as diallyl phthalate, diallyl terephthalate, diallyl isophthalate, diallyl epoxysuccinate, diallyl maleate, allyl cinnamate, allyl isocyanate, diallyl chlorendate, diallyl hexaphthalate, diallyl carbonate, and allyl diglycol carbonate; and aromatic vinyl compounds such as styrene, chlorostyrene, α-methylstyrene, α-methylstyrene dimer, vinyl naphthalene, isopropenyl naphthalene, bromostyrene and divinylbenzene. These monomers may be used in a single kind or mixed together in two or more kinds.

Even among the above-mentioned radical polymerizable monomers, it is desired to use the diacrylate compound or the dimethacrylate compound represented by the above general Formula (I) or the vinylbenzyl compound represented by the general formula (III) in an amount of from 80 to 90% by weight, to use the acrylate compound or the methacrylate compound having epoxy group represented by the general formula (II) in an amount of from 0.1 to 40% by weight, and monomers copolymerizable therewith such as 2-hydroxyethyl methacrylate, benzyl methacrylate, α-methylstyrene and α-methylstyrene dimer in amounts of from 0.1 to 50% by weight, by taking into consideration the durability in the photochromic property and color-developing/color-extinguishing speed exhibited by the polymer which is obtained by photo-polymerizing a mixture of the photochromic compound of the present invention and radical polymerizable monomers.

When a spiro-oxazine compound that will be described later is used as the photochromic compound, in particular, it is desired to use the radical polymerizable monomer represented by the general formula (II) in combination with the commercially available radical polymerizable monomer represented by the general formula (I) from the standpoint of suppressing color produced by the solvatochromism of the spiro-oxazine.

A second component in the photochromic composition of the present invention is a photochromic compound. As the photochromic compound, there can be used any compound without limitation provided it absorbs light in the visible range when it develops color. If absorptions in the visible range are concretely described, a photochromic compound that exhibits absorption characteristics around 400 to 480 nm develops orange color tone, a photochromic compound that exhibits absorption characteristics around 480 to 550 nm develops red to violet color tone, and a photochromic compound that exhibits absorption characteristics around 550 to 600 nm develops violet to blue color tone. These photochromic compounds may be used in a single kind or in a combination of two or more kinds to obtain intermediate color tones such as grey, brown, amber, etc.

Examples of the photochromic compound desirably used in the present invention include chromene compounds, fulgide compounds or fulgimide compounds and spiro-oxazine compounds. It is more desired to use the chromene compound and the spiro-oxazine compound than to use the fulgide and fulgimide compounds from the standpoint of accomplishing the photo polymerization in a decreased period of time.

As the chromene compound, any widely known compound can be used without limitation provided it has a chromen skeleton and photochromic property. For instance, a chromene compound represented by the following formula (1) can be preferably used

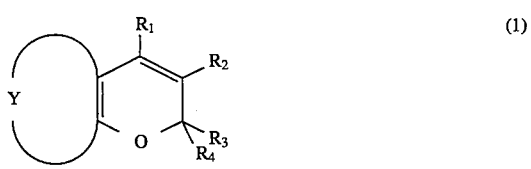

wherein $R_1$, $R_2$, $R_3$ and $R_4$ may be the same or different and are hydrogen atoms, hydrocarbon groups, substituted amino groups, aromatic hydrocarbon groups, unsaturated heterocyclic groups or saturated heterocyclic groups which may be substituted, $R_3$ and $R_4$ together may form a ring, and groups represented by

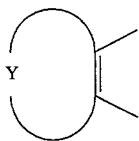

are aromatic hydrocarbon groups or unsaturated heterocyclic groups which may be substituted.

As the spiro-oxazine compound, any widely known compound can be used without limitation provided it has a spiro-oxazine skeleton and exhibits photochromic property. For instance, a spiro-oxazine compound represented by the following formula (2) can be suitably used,

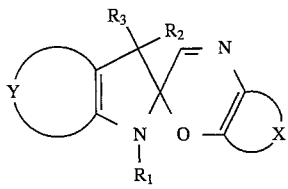

(2)

wherein $R_1$, $R_2$ and $R_3$ may be the same or different and are alkyl groups, cycloalkyl groups, cycloaralkyl groups, alkoxy groups, alkyleneoxyalkyl groups, alkoxycarbonyl groups, alkoxycarbonylalkyl groups, aryl groups, aralkyl groups aryloxy groups alkylenethioalkyl groups, acyl groups acyloxy groups or amino groups, $R_2$ and $R_3$ together may form a ring, $R_1$, $R_2$ and $R_3$ may have a substituent, and the substituent may be a halogen atom, a nitro group, a cyano group or a heterocyclic ring in addition to the above groups, and groups represented by

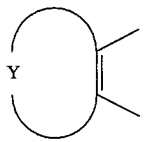

are aromatic hydrocarbon groups or unsaturated heterocyclic groups which may be substituted, and groups represented by

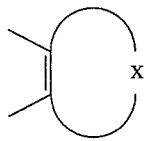

are aromatic hydrocarbon groups or unsaturated heterocyclic groups which may be substituted. As the substituents, the same groups as those represented by $R_1$, $R_2$ and $R_3$ may be used. Among them, however, groups represented by

$$-NR_4R_5$$

wherein $R_4$ and $R_5$ are alkyl groups, alkoxy groups or allyl groups which may be substituted, and $R_4$ and $R_5$ may be bonded and cyclized together to form a nitrogen-containing heterocyclic ring, are preferred.

Among the chromene compounds represented by the above-mentioned formula (1), however, it is desired to use those compounds in which $R_1$ and $R_2$ are both hydrogen atoms, $R_3$ and $R_4$ are alkyl groups which together form a bicyclo(3,3,1)nonylidene group or norbornylidene group, and the group

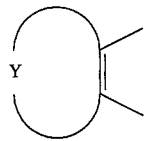

is a naphthalene ring which may be substituted. Furthermore, the spiro-oxazine compound represented by the above-mentioned formula (2) is desirably the one in which R1 is an alkyl group or an alkoxycarbonylalkyl group, $R_2$ and $R_3$ are cycloalkyl groups which together are forming a ring, the group

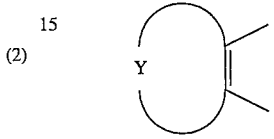

is an aromatic hydrocarbon group which may be substituted, the group

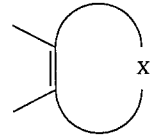

is an aromatic hydrocarbon group which may be substituted and, particularly, a naphthalene ring substituted with an amino group.

Examples of the chromene compound and spiro-oxazine compound that can be suitably used in the present invention include the following compounds.

Chromene compounds:
1) Spiro(norbornane-2,2'-(2H)benzo(h)chromene),
2) 7'-Methoxyspiro(bicyclo(3,3,1)nonane-9,2'-(2H)benzo(h)chromene),
3) 4'-Methylspiro(bicyclo(3,3,1)nonane-9,2'(2H)benzo(f)chromene),
4) 3'-Methylspiro(norbornane-2,2'-(2h)benzo(f)chromene), and
5) 2,2-Dimethyl-7-octoxy(2H)benzo(h)chromene).

Spiro-oxazine compounds:
1) 6-Fluoro-1'-methyl-8"-methoxy-6"-morpholinodispiro-(cyclohexane-1,3'-(3H)indole-2'-(2'H),3"-(3H)naphtho(3,2-a)(1,4)oxazine),
2) 1'-methoxycarbonylmethyl-8"-methoxy-6"-(4-methylpiperazino)dispiro(cyclohexane-1,3'-(3H)indole-2'-(2'H),3"-(3H)naphtho(3,2-a)(1,4)oxazine),
3) 1'-(2-(dioxazine-2-il)ethyl)-6"- morpholinodispiro(cyclohexane-1,3'-(3H)indole-2'-(2'H),3"-(3H)naphtho(3,2-1)(1,4)oxazine),
4) 5-Fluoro-1'-methyl-6"-piperizinodispiro(cyclohexane-1, 3'-(3H)indole-2'-(2'H),3"-(3H)naphtho(3,2a)(1,4)oxazine),
5) 8"-Methoxy- 1'-methyldispiro(cyclohexane-,1,3'(3H)indole-2'-(2'H),3"-(3H)naphtho(2,3-a)(1,4)oxazine), and
6) 6'-Fluoro-1'-isobutyl-6"-morpholinodispiro(cyclohexane-1,3'-(3H)indole-2'-(2'H),3"-(3H)naphtho(3,2-a)(1,4)oxazine).

In the present invention, it is essential that the photochromic compound is blended in an amount of from 0.001 to 0.2 parts by weight and, preferably, in an amount of not smaller than 0.01 part by weight but smaller than 0.1 part by weight with respect to 100 parts by weight of the radical polymerizable monomer. With the photochromic compound being blended in the above-mentioned amount, the radical polymerizable monomer polymerizes well upon photo polymerization and it is allowed to obtain a polymer exhibiting photochromic property that withstands for extended periods of time and exhibiting color at a desirable concentration. When the amount of the photochromic compound is not larger than 0.001 parts by weight, the photochromic property is not obtained with sufficient degree of color concentration. When the amount of the photochromic compound is larger than 0.2 parts by weight, on the other hand, the polymerization with light is not completed in a short period of time. When the radical polymerizable monomer is not polymerized to a sufficient degree, photochromic property tends to be deteriorated within short periods of time.

According to the present invention, the third component is a photo polymerization initiator. As the photo polymerization initiator, any widely known compound can be used without limitation that is added for photo-polymerizing the radical polymerizable monomers. Among the photo polymerization initiators that can be suitably used in the present invention, it is desired to use an acetophenone photo polymerization initiator, an α-dicarbonyl photo polymerization initiator, an acylphosphine oxide photo polymerization initiator and a bisacylphosphine oxide photo polymerization initiator from the standpoint of favorably carrying out the photo polymerization and obtaining the polymer with no color. Concretely speaking, it is desired to use the compounds represented by the following formulas (3), (4) and (5)

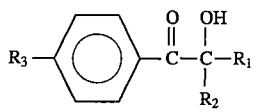  (3)

wherein $R_1$ and $R_2$ are alkyl groups which together may form a cyclohexane ring, and $R_3$ is an alkyl group or a hydrogen atom,

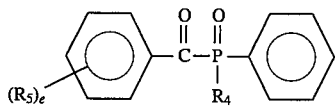  (4)

wherein $R_4$ is the same or different and is a methyl group, a methoxy group or a chlorine atom, e is 2 or 3, and $R_5$ is phenyl group or methoxy group.

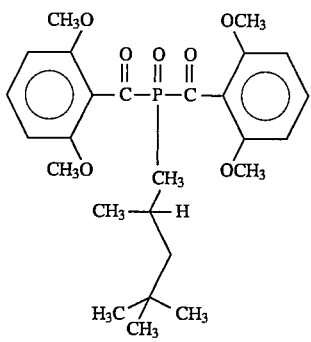  (5)

Examples of the photo polymerization initiator that can be preferably used in the present invention are as described below.

Acetophenone polymerization initiators:
1) 1-Phenyl-2-hydroxy-2-methylpropane-1-one,
2) 1-Hydroxycyclohexylphenyl ketone, and
3) 1-(4-Isopropylphenyl)-2-hydroxy-2-methylpropane-1-one.

α-Dicarbonyl compounds:

1) 1,2-Diphenylethanedione, and
2) Methylphenylglyoxylate.

Acylphosphine oxide photo polymerization initiators:
1) 2,6-Dimethylbenzoyldiphenylphosphine oxide,
2) 2,4,6-Trimethylbenzoyldiphenylphosphine oxide,
3) Methyl 2,4,6-trimethylbenzoyldiphenylphosphinate ester,
4) 2,6-Dichlorobenzoyldiphenylphosphine oxide, and
5) 2,6-Dimethoxybenzoyldiphenylphosphine oxide.

These photo polymerization initiators can be used in a single kind or in a combination of two or more kinds.

Bisacylphosphine oxide photo polymerization initiator:
1) Bis(2,B-dimethoxybenzoyl)-2,4,4-trimethylpentylphosphine oxide.

Among the above-mentioned photo polymerization initiators, those that have a main absorption in the ultraviolet region and have a molar absorption coefficient at 400 nm of not smaller than 150 1/mol-cm can be cured even by using visible light and are desired since they deteriorate photochromic compounds little during the polymerization. Concrete examples include: 1) 2,4,6-Trimethylbenzoylphenylphosphine oxide, and
2) Bis(2,6-dimethoxybenzoyl)-2,4,4-trimethylpentylphosphine oxide.

It is further allowable to add heat polymerization initiators in addition to the photo polymerization initiators. Any known heat polymerization initiator can be added without limitation.

In the present invention, the photo polymerization initiator is added in an amount of from 0.01 to 1 part by weight and, preferably, from 0.05 to 1 part by weight per 100 parts by weight of the radical polymerizable monomers. When the amount of its addition exceeds 1 part by weight, the obtained polymer loses uniformity in the inside thereof and exhibits poor hue. When the amount of its addition is smaller than 0.01 part by weight, the polymer is not cured to a sufficient degree.

The photochromic composition of the present invention can be photo-polymerized by a known polymerization method by pouring the composition into a mold. A representative example consists of pouring the photochromic composition of the present invention into the volume defined between mold halves that are held together by an elastomer gasket or a spacer, curing the composition with activated energy rays such as ultraviolet rays, and taking the composition out of the mold.

It is desired that the source of light used for the photo polymerization emits ultraviolet rays, such as metal halide lamp, low-pressure mercury lamp, high-pressure mercury lamp, ultrahigh-pressure mercury lamp, sterilizer lamp, xenon lamp and the like. It is also allowable to use visible light rays such as sunbeams. The irradiation time varies depending upon the wavelength and intensity of the source of light, shape and material of the polymer, and should be determined in advance by conducting experiments.

To carry out the photo polymerization, at least the surface of the mold to be irradiated with light must be transparent and glass or the like is usually used for this portion. It is particularly desired to use a quartz glass or like material that permits ultraviolet rays to easily pass through but there is no particular limitation on the material provided it is transparent. Moreover, the polymerization may be carried out under the application of external pressure during the molding.

In carrying out the photo polymerization, it is allowed to selectively use, as required, a variety of stabilizers and additives such as parting agent, ultraviolet-ray absorbing agent, ultraviolet-ray stabilizer, antioxidizing agent, coloring-preventing agent, antistatic agent, fluorescent dye, dye, pigment, perfume, etc.

Moreover, the polymer that exhibits photochromic property obtained by the above-mentioned photo polymerization method can be subjected to the following processings depending upon its use. That is, machining and secondary processing such as reflection-preventing processing, antistatic processing, etc. by dying using a dispersion dye or the like dye, by vaporizing a thin film of a metal oxide or by applying a thin film of an organic high molecular material, such as a silane coupling agent or a hard coating agent comprising chiefly sol components of silicon, zirconium antimony, aluminum, tin or tungsten, or a metal oxide such as $SiO_2$, $TiO_2$ or $ZrO_2$.

By using the photochromic composition of the present invention as described above, it is allowed to favorably carry out the polymerization with the irradiation of light within short periods of time. The obtained polymer changes from the colorless state to the colored state upon irradiation with sunbeams or light containing ultraviolet rays such as the light of a mercury lamp, the change being reversible, and exhibiting excellent dimming property. Moreover, the photochromic property is exhibited for extended periods of time.

Therefore, the polymer obtained by photo-polymerizing the photochromic composition of the present invention is useful as an organic glass to exhibit photochromic property, and can be desirably used for the applications of photochromic lenses.

EXAMPLES

The invention will now be described by way of Examples, but it should be noted that the invention is in no way limited to these Examples only. In Examples, "parts" are all by weight.

The following radical polymerizable monomers were used in the Examples.
1) Tetraethyleneglycol dimethacrylate,
2) Triethyleneglycol dimethacrylate,
3) 2,2-Bis(4-methacryloyloxyethoxyphenyl)propane,
4) Glycidyl methacrylate,
5) Benzyl methacrylate, and
6) 2-Hydroxyethyl methacrylate.

The following photochromic compounds were used:
1) Spiro(norbornane-2,2'-(2H)benzo(h)chromene),
2) 7'-Methoxyspiro(bicyclo(3,3,1)nonane-9,2'-(2H)benzo(h)chromene),
3) 4'-Methylspiro(bicyclo(3,3,1)nonane-9,2'(2H)benzo(f)chromene),
4) 3'-Methylspiro(norbornane-2,2'-(2H)benzo(f)chromene), and
5) 2,2-Dimethyl-7-octoxy(2H)benzo(h)chromene).

Spiro-oxazine compounds:
1) 6-Fluoro-1'-methyl-8"-methoxy-6"-morpholinodispiro-(cyclohexane-1,3'-(3H)indole-2'-(2'H),3"-(3H)naphtho(8,2-a)(1,4)oxazine),
2) 1'-Methoxycarbonylmethyl-8"-methoxy-6"-(4-methylpiperazino)dispiro(cyclohexane- 1,3'-(3H)indole-2'-(2'H ),3"-(3H)naphtho(3,2-a)(1,4)oxazine),
3) 1'-(2-dioxane-2-il)ethyl)-6"-morpholinodispiro(cyclohexane-1,3'-(3H)indole-2'-(2'H),3"-(3H)naphtho(3,2-a)(1,4)oxazine),
4) 5-Fluoro-1'-methyl-6"-piperizinodispiro(cyclohexane-1, 3'-(3H)indole-2'-(2'H),3"-(3H)naphtho(3,2-a)(1,4)oxazine),
5) 8"-Methoxydispiro(cyclohexane-1,3'-(3H)indole-2'-(2'H),3"-(3H)naphtho(2,3-a)(1,4)oxazine, and
6) 6'-Fluoro-1'-isobutyl-6"-morpholinodispiro(cyclohexane-1,3'-(3H)indole-2'-(2'H),3"-(3H)naphtho(3,2-a)(1,4)oxazine).

Photo polymerization initiators:
1) PHMP: 1-Phenyl-2-hydroxy-2-methylpropane-1-one,
2) HCPK: 1-Hydroxycyclohexylphenyl ketone,
3) MPG: Methylphenylglyoxylate,
4) TMDPO 2,4,6-Trimethylbenzoyldiphenylphosphine oxide,
5) IPTX: Isopropylthioxyxanthone, and
6) BDTP0 Bis(2,6-dimethoxybenzoyl)-2,4,4-trimethylpentylphosphine oxide.

The polymers obtained by the following Examples were measured for their properties by the methods described below. The results were as shown in Tables.

Color density:

The obtained polymer (2 mm thick) was irradiated with the light emitted from a xenon lamp, Model L-2480 (300 W)SHL-100, manufactured by Hamamatsu Photonics Co. through an aeromass filter (manufactured by Corning Co.) at 20°±1° C. with beam intensities of 365 nm=2.4 mW/cm$^2$ and 245 nm=24μ W/cm$^2$ on the surface of the polymer for 30 seconds to develop color. A difference in the light absorbency $\epsilon$ (30)–$\epsilon$ (0) was found and was regarded to be a color concentration, where $\epsilon$ (30) represents the absorbency at a maximum absorption wavelength of the photochromic compound of when it has developed color being irradiated with the light under the above-mentioned conditions for 30 seconds, and $\epsilon$ (0) represents the light absorbency at the same wavelength as that of developing color prior to being irradiated with the light.

Durability (life) of photochromic property:

Durability was measured by using a xenon fade meter, FA-25AX-HC, manufactured by Suga Shikenki Co. After irradiated with the light from the xenon fade meter for 200 hours ($T_{200}$), color of the polymer was developed by the above-mentioned method and the light absorbency at a maximum absorption wavelength based on the color developed by the photochromic compound was expressed as a ratio to the light absorbency based on the color of before being irradiated with the light from the fade meter ($T_0$). Durability of photochromic property is expressed as $A_{200}/A_0$ (%) in Tables.

Color tone:

The polymer was placed under the sunbeam for 10 minutes and its color tone was observed by eyes.

A polymer was obtained by photo-polymerizing a composition without containing the photochromic compound under the same conditions. The thus obtained colorless polymer was compared in regard to color with the above-mentioned polymer that exhibits photochromic property and that was heated, after having been photopolymerized, at 70° C. for 30 minutes not to develop color. The color of the polymer exhibiting the photochromic property was evaluated as described below. In Table 1, the item of this color is expressed as initial color.

⊚: Colorless like a polymer which is blended with no photochromic compound.

○: Faint yellow compared with the polymer blended with no photochromic compound.

X: Yellow compared with the polymer blended with no photochromic compound.

The results were as shown in Table 1.

Example 1

70 Parts of a tetraethylene glycol dimethacrylate, 15 parts of a triethylene glycol dimethacrylate, 10 parts of a glycidyl methacrylate, 5 parts of a 2-hydroxyethyl methacrylate, a chromene compound as a photochromic compound in amounts as shown in Table 1, 0.1 part of TMDPO as a photo polymerization initiator, and 0.1 part of HCPK, were mixed together to a sufficient degree. The mixture solution was poured into a mold constituted by a glass plate and a gasket made of an ethylene/vinyl acetate copolymer, and was irradiated with the light emitted from a metal halide lamp of an output of 120 W/cm² for two minutes. After the polymerization, the polymer was taken out from the mold. The results were as shown in Table 1.

TABLE 1

| No. | Chromene compound No. | Amount of chromene (parts) | $T_0$ color density | $T_0$ color tone | $T_{200}$ $A_{200}/A_0$ (%) | Initial color |
|---|---|---|---|---|---|---|
| 1  | 1 | 0.04   | 0.42 | yellow | 78.2 | ⊙ |
| 2  | 2 | 0.04   | 0.45 | orange | 81.6 | ⊙ |
| 3  | 3 | 0.04   | 0.28 | yellow | 79.2 | ⊙ |
| 4  | 4 | 0.04   | 0.26 | orange | 78.5 | ⊙ |
| 5  | 5 | 0.04   | 0.31 | orange | 80.7 | ⊙ |
| 6  | 2 | 0.01   | 0.32 | orange | 72.4 | ⊙ |
| 7  | 2 | 0.08   | 0.54 | orange | 84.6 | ⊙ |
| 8  | 2 | 0.15   | 0.60 | orange | 68.7 | ⊙ |
| 9  | 2 | 0.0003 | 0.05 | orange | 40.0 | ⊙ |
| 10 | 2 | 0.25   | 0.60 | orange | 15.0 | ○ |

*Nos. 9 and 10 are Comparative Examples.

Example 2

The procedure was carried out in the same manner as in Example 1 but using a spiro-oxazine compound as a photochromic compound in amounts as shown in Table 2.

TABLE 2

| No. | Spiro-oxazine compound No. | Amount of spiro-oxazine (parts) | Before irradiation ($T_0$) color density | Before irradiation ($T_0$) color tone | After irradiation ($T_{200}$) $A_{200}/A_0$ (%) | Initial color |
|---|---|---|---|---|---|---|
| 1  | 1 | 0.04   | 0.56 | bluish violet | 81.5 | ⊙ |
| 2  | 2 | 0.04   | 0.53 | bluish violet | 83.8 | ⊙ |
| 3  | 3 | 0.04   | 0.63 | blue          | 85.3 | ⊙ |
| 4  | 4 | 0.04   | 0.54 | violet        | 80.2 | ⊙ |
| 5  | 5 | 0.04   | 0.41 | blue          | 78.6 | ⊙ |
| 6  | 6 | 0.04   | 0.60 | bluish violet | 80.5 | ⊙ |
| 7  | 1 | 0.01   | 0.45 | bluish violet | 72.2 | ⊙ |
| 8  | 1 | 0.08   | 0.64 | bluish violet | 85.4 | ⊙ |
| 9  | 1 | 0.15   | 0.68 | bluish violet | 68.1 | ⊙ |
| 10 | 1 | 0.0003 | 0.04 | bluish violet | 41.1 | ⊙ |
| 11 | 1 | 0.25   | 0.62 | bluish violet | 13.9 | ○ |

*Nos. 10 and 11 are Comparative Examples.

Example 3

The procedure was carried out in the same manner as in Example 1 but using, as the photochromic compound, a chromene compound 2) in amounts as shown in Table 3 and a spiro-oxazine compound 1) in amounts as shown in Table 3 in combination. In the measurement of life being irradiated with the fade meter, the light absorbency was measured at a maximum absorbency wavelength based on the color developed by the spiro-oxazine compound. Moreover, the color tone of the polymer was observed by eye under sunlight before the polymer was irradiated with the fade meter and after the polymer was irradiated with the fade meter ($T_0$: 0 hour, $T_{200}$: 200 hours).

The results were as shown in Table 3.

TABLE 3

| No. | Amount of chromene (parts) | Amount of spiro-oxazine (parts) | Before irradiation ($T_0$) color density | Before irradiation ($T_0$) color tone | After irradiation ($T_{200}$) $A_{200}/A_0$ (%) | After irradiation ($T_{200}$) color tone | Initial color |
|---|---|---|---|---|---|---|---|
| 1 | 0.01  | 0.01 | 0.45 | brown | 72.2 | brown | ⊙ |
| 2 | 0.02  | 0.02 | 0.50 | brown | 76.5 | brown | ⊙ |
| 3 | 0.04  | 0.04 | 0.56 | brown | 81.5 | brown | ⊙ |
| 4 | 0.08  | 0.08 | 0.64 | brown | 65.2 | brown | ⊙ |
| 5 | 0.005 | 0.01 | 0.45 | gray  | 72.4 | gray  | ⊙ |
| 6 | 0.01  | 0.02 | 0.52 | gray  | 78.9 | gray  | ⊙ |

TABLE 3-continued

| No. | Amount of chromene (parts) | Amount of spiro-oxazine (parts) | Before irradiation (T$_0$) | | After irradiation (T$_{200}$) | | Initial color |
|---|---|---|---|---|---|---|---|
| | | | color density | color tone | A$_{200}$/A$_0$ (%) | color tone | |
| 7 | 0.02 | 0.04 | 0.58 | gray | 82.3 | gray | ◉ |
| 8 | 0.04 | 0.08 | 0.68 | gray | 64.7 | gray | ◉ |
| 9 | 0.0002 | 0.0002 | 0.05 | brown | 40.0 | brown | ◉ |
| 10 | 0.125 | 0.125 | 0.60 | brown | 15.0 | brown | ○ |

*Nos. 9 and 10 are Comparative Examples.

Example 4

The procedure was carried out in the same manner as in Example 3 but using radical polymerizable monomers of a composition of 70 parts of 2,2-bis(4-methacryloyloxyethoxyphenyl) propane, 20 parts of benzyl methacrylate and 10 parts of glycidyl methacrylate.

TABLE 4

| No. | Amount of chromene (parts) | Amount of spiro-oxazine (parts) | Before irradiation (T$_0$) | | After irradiation (T$_{200}$) | | Initial color |
|---|---|---|---|---|---|---|---|
| | | | color density | color tone | A$_{200}$/A$_0$ (%) | color tone | |
| 1 | 0.01 | 0.01 | 0.54 | brown | 75.2 | brown | ◉ |
| 2 | 0.02 | 0.02 | 0.60 | brown | 79.8 | brown | ◉ |
| 3 | 0.04 | 0.04 | 0.67 | brown | 84.5 | brown | ◉ |
| 4 | 0.08 | 0.08 | 0.72 | brown | 68.2 | brown | ◉ |
| 5 | 0.005 | 0.01 | 0.55 | gray | 76.1 | gray | ◉ |
| 6 | 0.01 | 0.02 | 0.62 | gray | 80.7 | gray | ◉ |
| 7 | 0.02 | 0.04 | 0.70 | gray | 85.4 | gray | ◉ |
| 8 | 0.04 | 0.08 | 0.75 | gray | 67.1 | gray | ◉ |
| 9 | 0.0002 | 0.0002 | 0.04 | brown | 42.1 | brown | ◉ |
| 10 | 0.125 | 0.125 | 0.62 | brown | 13.9 | brown | ○ |

*Nos. 9 and 10 are Comparative Examples.

Example 5

The procedure was carried out in the same manner as in Example 3 but photo-polymerizing the compositions that are shown in Table 5. The results were as shown in Table 5.

Example 6

A glycidyl methacrylate was added in amounts as shown in Table 6 to a mixture of 70 parts of a tetraethylene glycol dimethacrylate, 15 parts of a triethylene glycol dimethacrylate, 5 parts of a 2-hydroxyethyl methacrylate, 0.04 parts of a spiro-oxazine compound (6), 0.1 part of TMDPO and 0.1 part of HCPK as photo polymerization initiators. The mixture was stirred to a sufficient degree and was polymerized in the manner as in Example 1.

TABLE 5

| | Chromene | | Spiro-oxazine | | Photo polymerization | | (T$_0$) | | (T$_{200}$) | | Initial color |
|---|---|---|---|---|---|---|---|---|---|---|---|
| No. | No. | Amount (parts) | No. | Amount (parts) | Kind | Amount (parts) | Light absorbancy | color tone | A$_{200}$/A$_0$ (%) | color tone | |
| 1 | 1 | 0.04 | 2 | 0.04 | PHMP | 0.2 | 0.54 | brown | 81.5 | brown | ◉ |
| 2 | 2 | 0.02 | 3 | 0.04 | MPG | 0.1 | 0.59 | gray | 85.2 | gray | ◉ |
| 3 | 3 | 0.05 | 4 | 0.03 | HCPK | 0.3 | 0.50 | amber | 81.2 | amber | ◉ |
| 4 | 4 | 0.06 | 5 | 0.02 | HCPK | 0.5 | 0.25 | gray | 80.6 | gray | ◉ |
| 5 | 5 | 0.03 | 1 | 0.04 | TMDPO | 0.8 | 0.55 | gray | 82.0 | gray | ◉ |
| 6 | 2 | 0.01 | 2 | 0.02 | TMDPO | 0.07 | 0.48 | gray | 80.5 | gray | ◉ |
| 7 | 2 | 0.08 | 4 | 0.03 | HCPK/MPG | 0.3/0.3 | 0.51 | amber | 81.5 | amber | ◉ |
| 8 | 1 | 0.02 | 3 | 0.04 | PHMP/HCPK | 0.1/0.1 | 0.58 | gray | 84.6 | gray | ◉ |
| 9 | 1 | 0.04 | 4 | 0.04 | HCPK/TMDPO | 0.2/0.4 | 0.52 | brown | 83.2 | brown | ◉ |
| 10 | 1 | 0.02 | 5 | 0.04 | PHMP/TMDPO | 0.4/0.4 | 0.41 | gray | 81.2 | gray | ◉ |
| 11 | 2 | 0.04 | 1 | 0.04 | IPTX | 0.2 | 0.54 | brown | 81.3 | brown | ○ |
| 12 | 2 | 0.04 | 6 | 0.04 | TMDPO | 0.2 | 0.58 | brown | 80.6 | brown | ◉ |
| 13 | 1 | 0.03 | 6 | 0.05 | BDTPO | 0.1 | 0.63 | gray | 81.4 | gray | ◉ |
| 14 | 1/2 | 0.04/0.04 | 6 | 0.08 | TMDPO | 0.2 | 0.68 | brown | 69.6 | brown | ◉ |
| 15 | 1 | 0.04 | 1/5 | 0.04/0.02 | BDTPO | 0.1 | 0.60 | gray | 79.8 | gray | ◉ |

The obtained polymers were measured for their absorbancy of initial colors. The detected wavelength was the same as the maximum absorption wavelength of when the spiro-oxazine compound (6) developed its color. The results were as shown in Table 6.

TABLE 6

| No. | Amount of glycidyl methacrylate (parts) | absorbancy |
|-----|-----------------------------------------|------------|
| 1   | 0.05                                    | 0.1        |
| 2   | 0.1                                     | 0.02       |
| 3   | 0.5                                     | 0.02       |
| 4   | 1                                       | 0.02       |
| 5   | 5                                       | 0.02       |
| 6   | 10                                      | 0.01       |
| 7   | 15                                      | 0.01       |
| 8   | 0                                       | 1.0        |

We claim:

1. A photochromic composition comprising:
   (A) at least one radical polymerizable monomer,
   (B) 0.001 to 0.2 part by weight of a photochromic compound selected from the group consisting of a chromene compound, a spiro-oxazine compound and mixtures thereof, per 100 parts by weight of (A), and
   (C) 0.01 to 1 part by weight of a photopolymerization initiator, per 100 parts by weight of (A).

2. A photochromic composition according to claim 1, wherein the radical polymerizable monomer is at least one of those selected from a diacrylate compound or a dimethacrylate compound represented by the following general formula (I), an acrylate compound or a methacrylate compound having an epoxy group represented by the general formula (II), and a vinylbenzyl compound represented by the general formula (III), general formula (I),

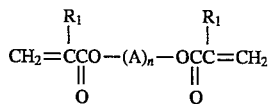

wherein $R_1$ and $R_2$ may be the same or different and are hydrogen atoms or methyl groups, and A is the same or different alkylene group, oxyalkylene group, or a group of the following formula which may be substituted,

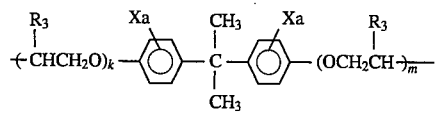

wherein $R_3$ is a hydrogen atom or a methyl group, X is a halogen atom, k and m are integers of from 0 to 1, a is an integer of from 0 to 4 representing the substitution number of halogen atoms, and n is an integer of from 1 to 20, general formula (II),

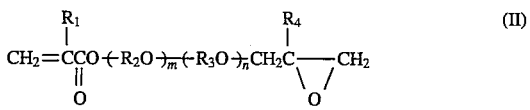

wherein $R_1$ and $R_4$ are hydrogen atoms or methyl groups, and $R_2$ and $R_3$ may be the same or different and are alkylene group or groups of the following formula which may be substituted,

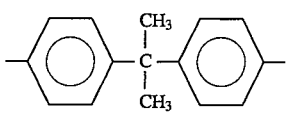

wherein m and n are 0 or 1 general formula (III),

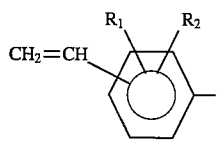 —CH$_2$+X$_1$\{CH$_2$CH$_2$X$_2$(CH$_2$CH$_2$X$_3$)$_j$\}$_k$+$_m$—CH$_2$— 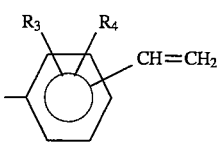

wherein $R_1$, $R_2$, $R_3$ and $R_4$ may be the same or different and are halogen atoms, $X_1$, $X_2$ and $X_3$ are oxygen atoms or sulfur atoms, j, k and m are 0 or 1, respectively, and j=0 when k=0 or k=j=0 when m=0, but $X_1$, $X_2$ and $X_3$ are not simultaneously sulfur atoms when m=k=1 and j=0.

3. A photochromic composition according to claim 2, wherein said at least one radical polymerizable monomer (A) further comprises a monomer that is copolymerizable with said monomer of the general formula (I), said monomer of the general formula (II) or said monomer of the general formula (III) but different therefrom.

4. A photochromic composition according to claim 3, wherein the monomer which is copolymerizable with the radical polymerizable monomer (A) is at least the one selected from an acrylic ester compound, a methacrylic ester compound, a fumaric ester compound, an arylated compound and an aromatic vinyl compound.

5. A photochromic composition according to claim 2, wherein the radical polymerizable monomer is a composition containing 30 to 90% by weight of a monomer of the general formula (I) or a monomer of the general formula (III), 0.1 to 40% by weight of an epoxy monomer of the general formula (II), and 0.1 to 50% by weight of another monomer copolymerizable with said monomers.

6. A photochromic composition according to claim 1, wherein the chromene compound is represented by the following formula (1),

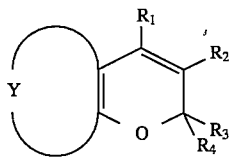

wherein $R_1$, $R_2$, $R_3$ and $R_4$ may be the same or different and are hydrogen atoms, hydrocarbon groups, substituted amino groups, aromatic hydrocarbon groups, unsaturated heterocyclic groups or saturated heterocyclic groups which may be substituted, $R_3$ and $R_4$ together may form a ring, and groups represented by

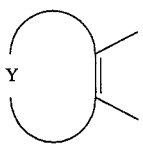

are aromatic hydrocarbon groups or unsaturated heterocyclic groups which may be substituted.

7. A photochromic composition according to claim 1, wherein the spiro-oxazine compound is represented by the following formula (2)

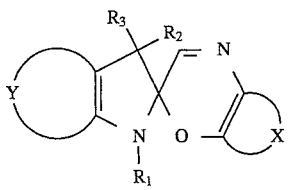

wherein $R_1$, $R_2$ and $R_3$ may be the same or different and are alkyl groups, cycloalkyl groups, cycloaralkyl groups, alkoxy groups, alkyleneoxyalkyl groups, alkoxycarbonyl groups, alkoxycarbonylalkyl groups, aryl groups, aralkyl groups, aryloxy groups, alkylenethioalkyl groups, acyl groups acyloxy groups or amino groups, $R_2$ and $R_3$ together may form a ring, $R_1$, $R_2$ and $R_3$ may have a substituent, and the substituent may be a halogen atom, a nitro group, a cyano group or a heterocyclic ring in addition to the above groups, and groups represented by

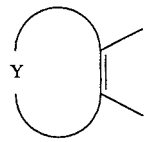

are aromatic hydrocarbon groups or unsaturated heterocyclic groups which may be substituted, and groups represented by

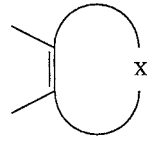

are aromatic hydrocarbon groups or unsaturated heterocyclic groups which may be substituted.

8. A photochromic composition comprising:

(A) at least one radical polymerizable monomer, (B) 0.001 to 0.2 part by weight of a spiro-oxazine compound, per 100 parts by weight of (A), (C) 0.01 to 1 part by weight of a photo polymerization initiator, per 100 parts by weight of (A), and (D) 0.01 to 20 parts by weight of a compound having at least one epoxy group in the molecule, per 100 parts by weight of (A).

9. A photochromic composition according to claim 1, wherein the photochromic compound (B) is present in an amount of not smaller than 0.01 but smaller than 0.1 part by weight per 100 parts by weight of said at least one radical polymerizable monomer (A).

10. A photochromic composition according to claim 1, wherein the photo polymerization initiator (C) is an acetophenone photo polymerization initiator, an α-dicarbonyl photo polymerization initiator, an acylphosphine oxide photo polymerization initiator, or a bisacylphosphine oxide photo polymerization initiator.

11. A photochromic composition according to claim 1 or 8, wherein the photo polymerization initiator (C) exhibits a main absorption in an ultraviolet region and a molar absorption coefficient at 400 nm of larger than 150 l/mol-cm.

12. A method of producing a photochromic cured product comprising polymerizing the photochromic composition of claim 1 by irradiating said composition with the light emitted from a source of light that emits ultraviolet rays.

13. A method of producing a photochromic cured product according to claim 12 wherein said photochromic composition is irradiated with an active energy ray having an emission spectrum at longer than 250 nm.

14. A method of producing a photochromic cured product according to claim 12, wherein the photochromic compound (B) is a spiro-oxazine compound, and said composition is photo-polymerized in the presence of a compound which has at least one epoxy group in the molecules.

* * * * *

(12) EX PARTE REEXAMINATION CERTIFICATE (4897th)
United States Patent
Kobayakawa et al.

(10) Number: US 5,621,017 C1
(45) Certificate Issued: *Jan. 27, 2004

(54) PHOTOCHROMIC COMPOSITION AND METHOD PRODUCING PHOTOCHROMIC CURED PRODUCT

(75) Inventors: Takashi Kobayakawa, Tokuyama (JP); Junji Momoda, Tokuyama (JP)

(73) Assignee: Tokuyama Corporation, Tokuyama (JP)

Reexamination Request:
No. 90/006,383, Sep. 16, 2002

Reexamination Certificate for:
Patent No.: 5,621,017
Issued: Apr. 15, 1997
Appl. No.: 08/428,641
Filed: Apr. 25, 1995

(*) Notice: This patent is subject to a terminal disclaimer.

(30) Foreign Application Priority Data

Apr. 27, 1994 (JP) .............................................. 6-089418

(51) Int. Cl.$^7$ .............................. C08F 2/46; G02B 5/23
(52) U.S. Cl. .............................. 522/16; 522/26; 522/36; 522/37; 522/48; 522/64; 522/170; 522/182; 252/586
(58) Field of Search .............................. 522/16, 26, 48, 522/64, 36, 37; 252/586

(56) References Cited

U.S. PATENT DOCUMENTS

| 4,780,393 A | 10/1988 | Frommeld |
| 5,531,940 A | 7/1996 | Gupta et al. |
| 5,910,516 A * | 6/1999 | Imura et al. |

FOREIGN PATENT DOCUMENTS

| JP | 1-204902 | 8/1989 |
| JP | 2-205851 | 8/1990 |
| JP | 3-261945 | 11/1991 |
| JP | 5-306392 | 11/1993 |

* cited by examiner

*Primary Examiner*—Susan Berman

(57) ABSTRACT

A photochromic composition which can be polymerized and cured upon irradiation with active energy rays such as ultraviolet rays to exhibit favorable photochromic property. The photochromic composition comprises 100 parts by weight of a radical polymerizable monomer, 0.001 to 0.2 parts by weight of a photochromic compound, and 0.01 to 1 part by weight of a photo polymerization 1.0 initiator. A photochromic cured product is obtained by irradiating the photochromic composition with the light which contains ultraviolet rays.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

Claims 10 and 11 are cancelled.

Claim 1 is determined to be patentable as amended.

Claims 2–7, 9 and 12–14, dependent on an amended claim, are determined to be patentable.

New claim 15 is added and determined to be patentable.

1. A photochromic composition comprising:
(A) at least one radical polymerizable monomer,
(B) 0.001 to 0.2 part by weight of a photochromic compound selected from the group consisting of a chromene compound, a spiro-oxazine compound and mixtures thereof, per 100 parts by weight of (A), and
(C) 0.01 to 1 part by weight of a photopolymerization initiator *selected from the group consisting of a α-dicarbonyl photo polymerization initiator, an acylphosphine oxide photo polymerization initiator, and a bisacylphosphine oxide photo polymerization initiator*, per 100 parts of by weight of (A).

*15. A photochromic composition comprising:*
*(A) at least one radical polymerizable monomer,*
*(B) 0.001 to 0.2 part by weight of a photochromic compound selected from the group consisting of a chromene compound, a spiro-oxazine compound and mixtures thereof, per 100 parts by weight of (A), and*
*(C) 0.01 to 1 part by weight of a photopolymerization initiator having a main absorption in an ultraviolet region and a molar absorption coefficient at 400 nm of larger than 150 l/mol-cm, per 100 parts by weight of (A).*

* * * * *